United States Patent
Göttling et al.

(10) Patent No.: US 6,832,555 B2
(45) Date of Patent: Dec. 21, 2004

(54) ALIGNING APPARATUS FOR PRINTING UNITS OF PRINTING PRESSES

(75) Inventors: Josef Göttling, Friedberg (DE); Thomas Hartmann, Friedberg (DE); Godber Petersen, Augsburg (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 10/719,618

(22) Filed: Nov. 21, 2003

(65) Prior Publication Data

US 2004/0134368 A1 Jul. 15, 2004

(30) Foreign Application Priority Data

Nov. 29, 2002 (DE) .......................................... 102 56 109

(51) Int. Cl.[7] .............................................. B41F 13/00
(52) U.S. Cl. .................... 101/479; 101/480; 248/188.4; 248/650
(58) Field of Search ................................ 101/216, 479, 101/480; 74/16; 248/637, 649, 650, 346.01, 346.03, 346.06, 676, 678, 188, 188.4, 188.2, 677

(56) References Cited

U.S. PATENT DOCUMENTS 5,104,075 A * 4/1992 Freeman .................. 248/188.4
6,568,322 B2 * 5/2003 Gottling et al. ............. 101/216

FOREIGN PATENT DOCUMENTS

DE        100 17 507 A1 * 10/2001

* cited by examiner

Primary Examiner—Leslie J. Evanisko
(74) Attorney, Agent, or Firm—Cohen, Pontani, Lieberman & Pavane

(57) ABSTRACT

An aligning apparatus for heavy loads, in particular a printing unit, includes at least one support plate, which is rotatably mounted on a base plate screwed to an erection surface and can be positioned on the base plate with regard to its horizontal position by means of adjusting screws. Each support plate interacts with a vertical adjusting screw which is provided for adjusting the vertical position of the printing unit and can be fixed to the printing unit, each vertical adjusting screw being designed with a spherical end which is supported on the plate in a spherical recess designed with little play or as a locating fit.

5 Claims, 6 Drawing Sheets

ALIGNING APPARATUS FOR PRINTING UNITS OF PRINTING PRESSES

BACKGROUND OF THE INVENTION

1. Field of the Invention

The invention relates to an aligning apparatus for printing units of printing presses.

2. Description of the Related Art

It is known to erect printing units with the aid of at least four adjustable machine feet, what are known as fixators. These machine feet permit setting of the height. Devices which additionally aid the aligning of the printing units in a line are also known.

When printing units are erected on at least four feet, even the smallest height differences of the feet create stresses and distortion in the printing unit, i.e. the two printing-unit walls are displaced with respect to one another. Here, at least two feet are fitted to each of the two printing-unit walls. Each pair of feet exerts a turning moment on the associated wall in the process. Accordingly, numerous adjusting and aligning operations are required in order to erect a previously installed printing unit at a new location, so as to avoid damaging the printing unit as a result of stresses or distortion. It is also known that these aligning operations have to be repeated in order to counteract building movements.

SUMMARY OF THE INVENTION

It is an object of the invention to make a simply constructed apparatus for erecting printing units possible, which, moreover, avoids damage as a result of stresses or distortion.

The printing unit has a torsionally rigid base frame and is erected on three points instead of on four, with the aid of adjusting units known per se, what are known as fixators. This erecting process is statically determined and also customary in the case of other machines. No moments can be exerted on the printing-unit frame as a result of this erecting process. The installation state and therefore also the installation accuracy are preserved even after the printing unit is moved. Re-erecting the unit at the customer after transport is simplified and thus substantially accelerated.

It is important that the alignment procedure during erection is simplified and accelerated using the aligning apparatus. A further advantage is that setting phenomena cannot be stressed and distorted again after the printing unit has been aligned.

A substantial advantage of the aligning apparatus is that the vertical adjusting screws, which are arranged on the printing unit, have spherically configured ends, by which they engage in a recess on the positionable plate and are supported there. It is important that the spherical end is mounted in the recess, which is designed as a locating fit, so as to twist or rotate and is completely supported in the recess by means of its spherical surface, so that a short force flow is produced and the rigidity of the entire aligning apparatus is increased. The force, which is transmitted from the adjusting screw to the plate and results from the high mass of the printing unit, can flow in an optimum manner from the adjusting screw to the plate as a result of the configuration as a locating fit, the adjusting screw and the plate representing an "unreleasable" connection as a result of the pressure.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
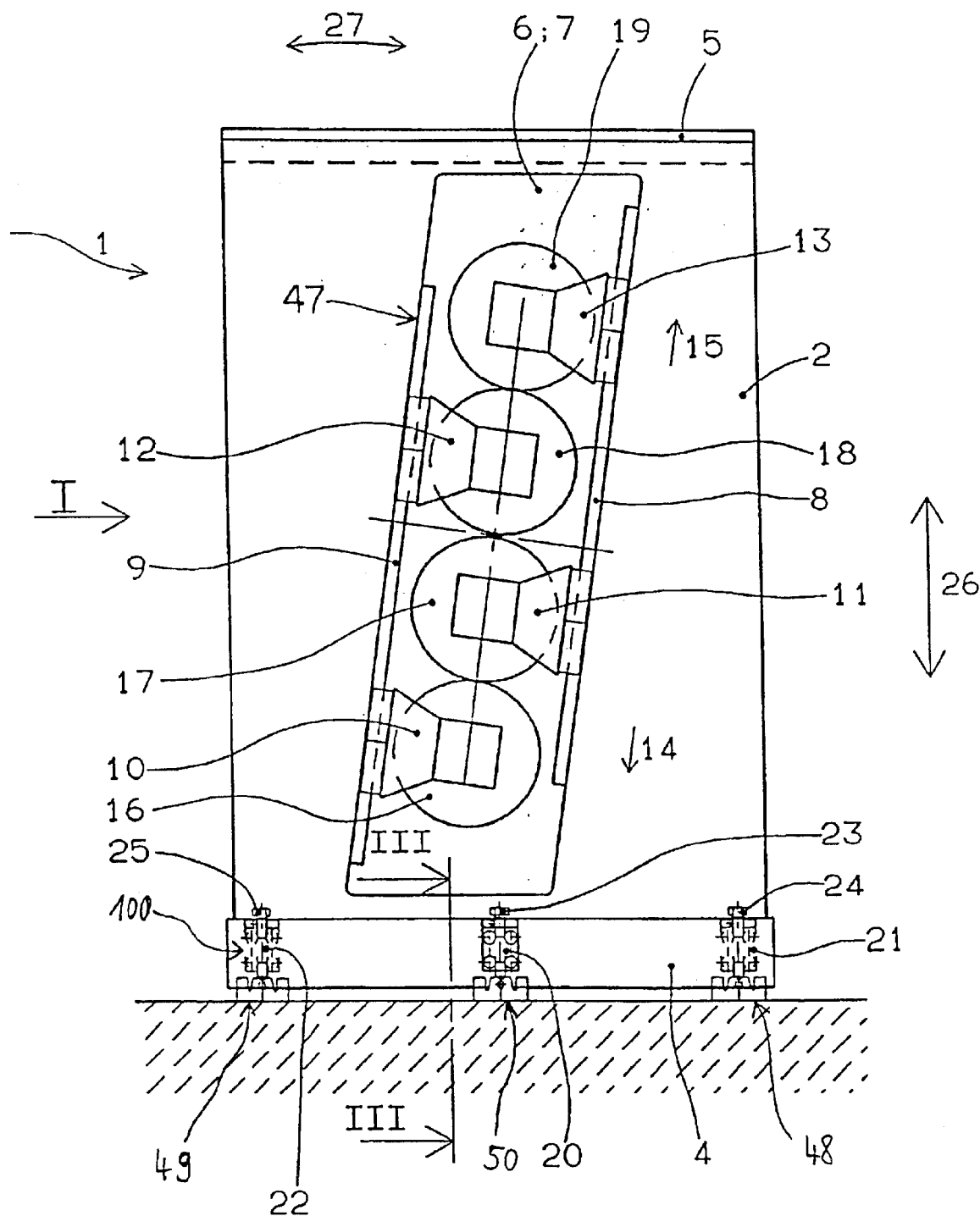
FIG. 1 is a schematic end view of a printing unit.
Figure 2:
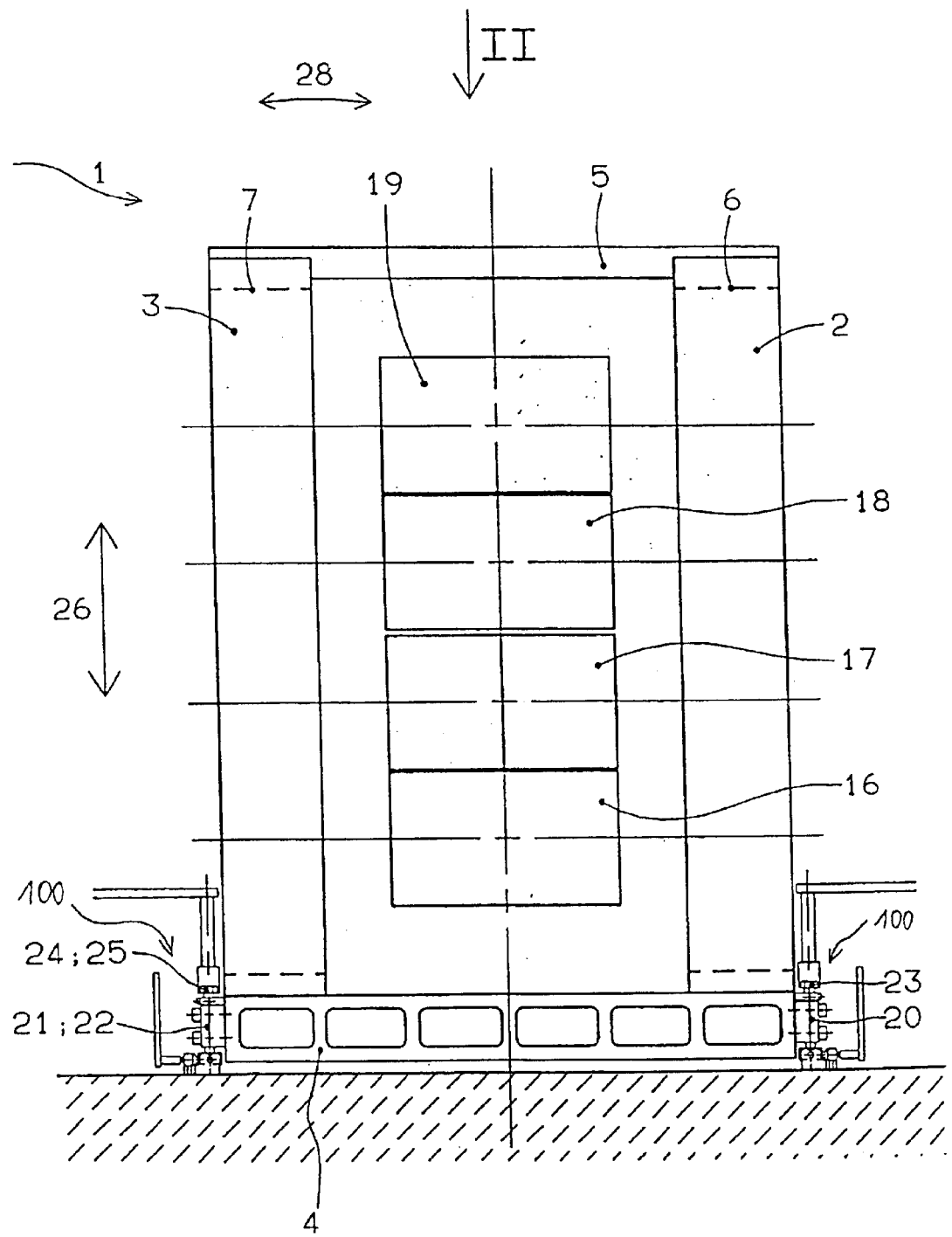
FIG. 2 is an end view I according to FIG. 1.

FIG. 1 and FIG. 2 schematically show a double printing unit 47 with aligning apparatus 100. A frame 1 of this printing unit 47 is composed in a torsionally rigid manner of side walls 2 and 3 and a base plate 4 and a cover plate 5. Guides 8; 9 are fastened in openings 6; 7 of the side walls 2; 3 in a known manner, on which guides 8; 9 it is possible to move bearing slides 10 to 13 in the directions of the arrows 14; 15 in a manner not shown in more detail here. Impression cylinders 16 to 19 are rotatably mounted on these bearing slides 10 to 13 in a known manner.

As FIG. 1 and FIG. 2 show, adjustable feet 20 to 22 known per se are fastened to the base plate 4 of the frame 1. It is then possible to align the printing unit 47 in terms of height and inclination using vertical adjusting screws 23 to 25, which is indicated by the double arrows 26 to 28. The adjustable feet 20 to 22 and the adjusting screws 23 to 25 form the aligning apparatus 100.

Figure 3:
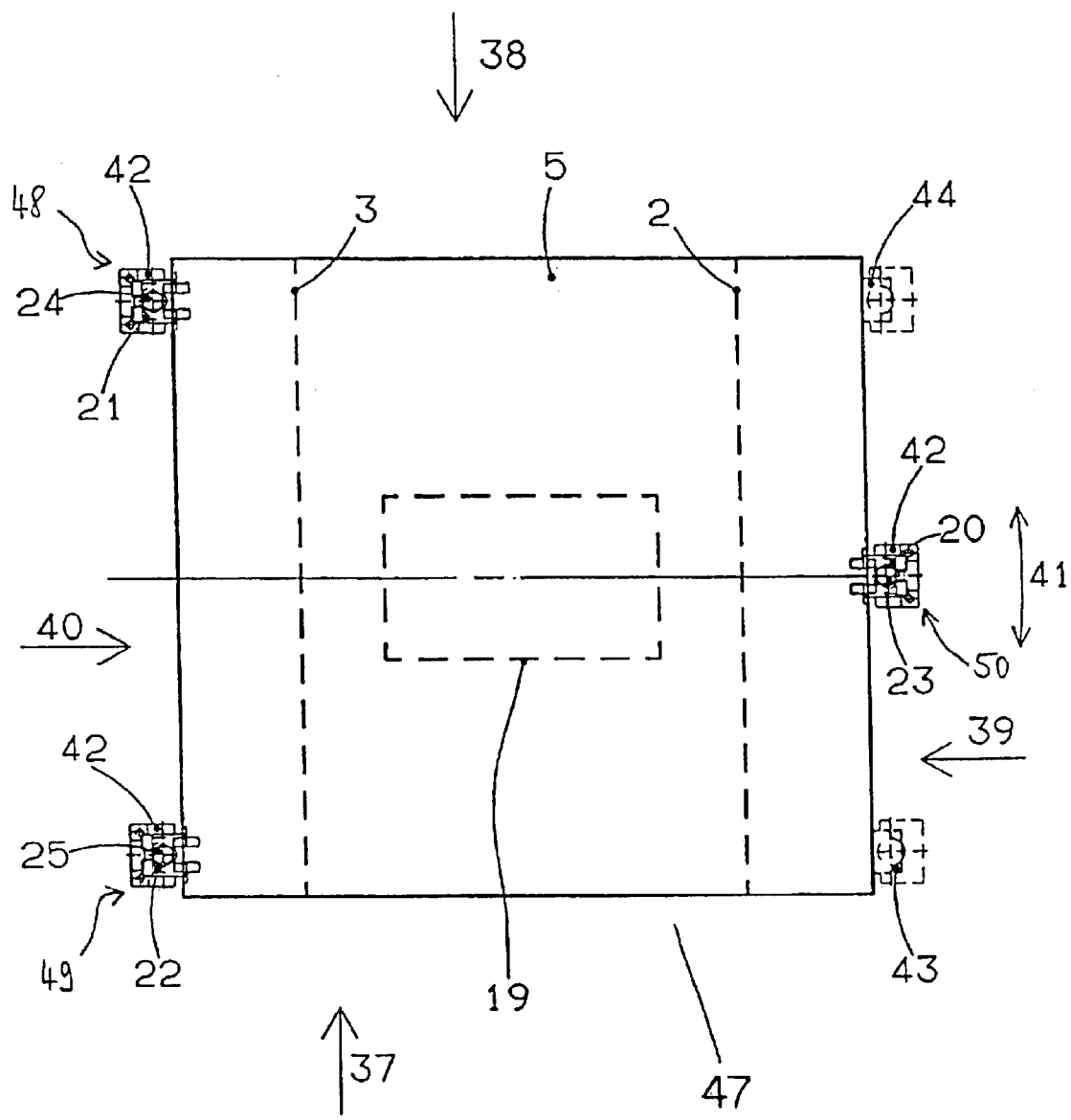
FIG. 3 is a plan view II according to FIG. 2.
Figure 4:
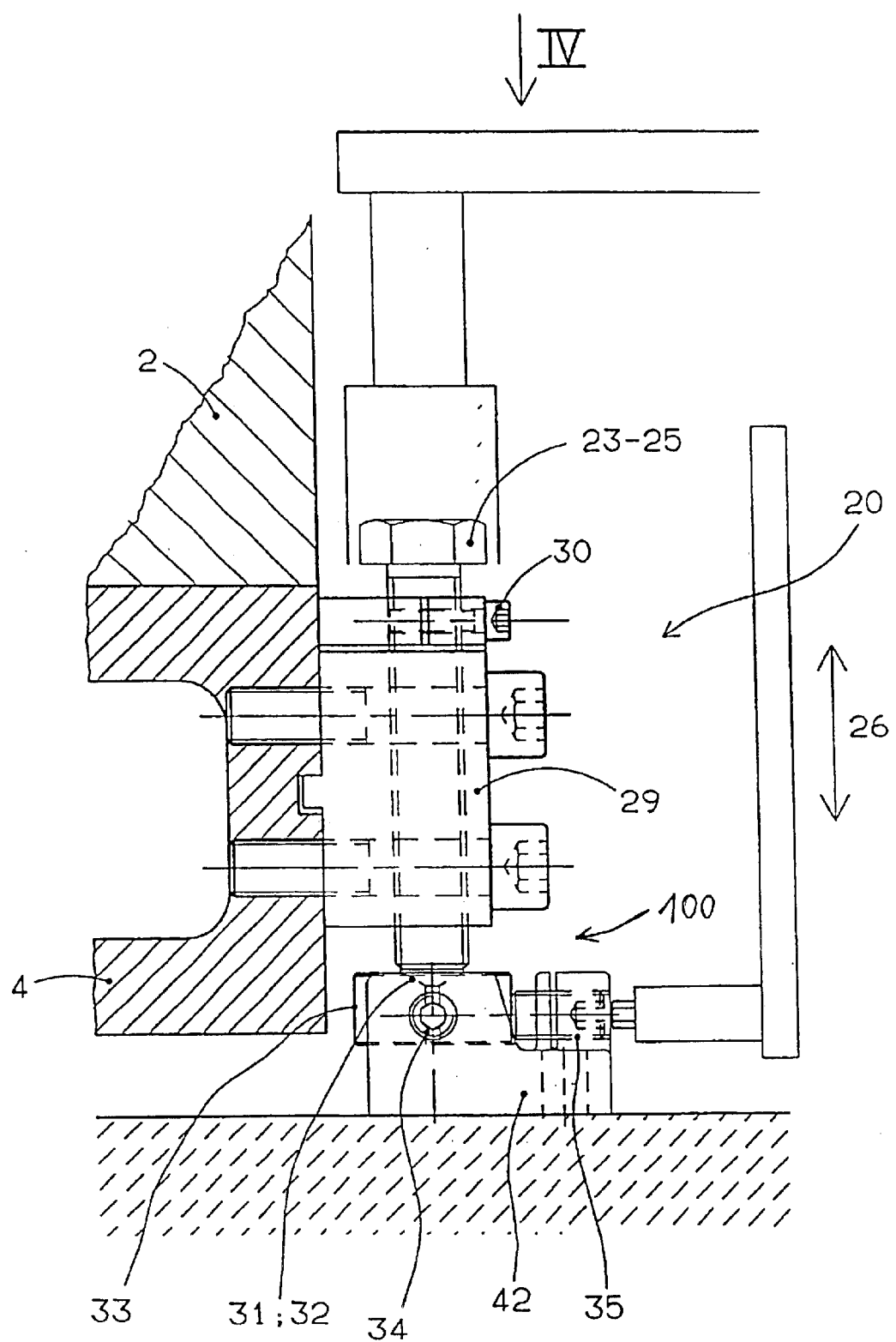
FIG. 4 is a partial section III—III from FIG. 1.
Figure 5:
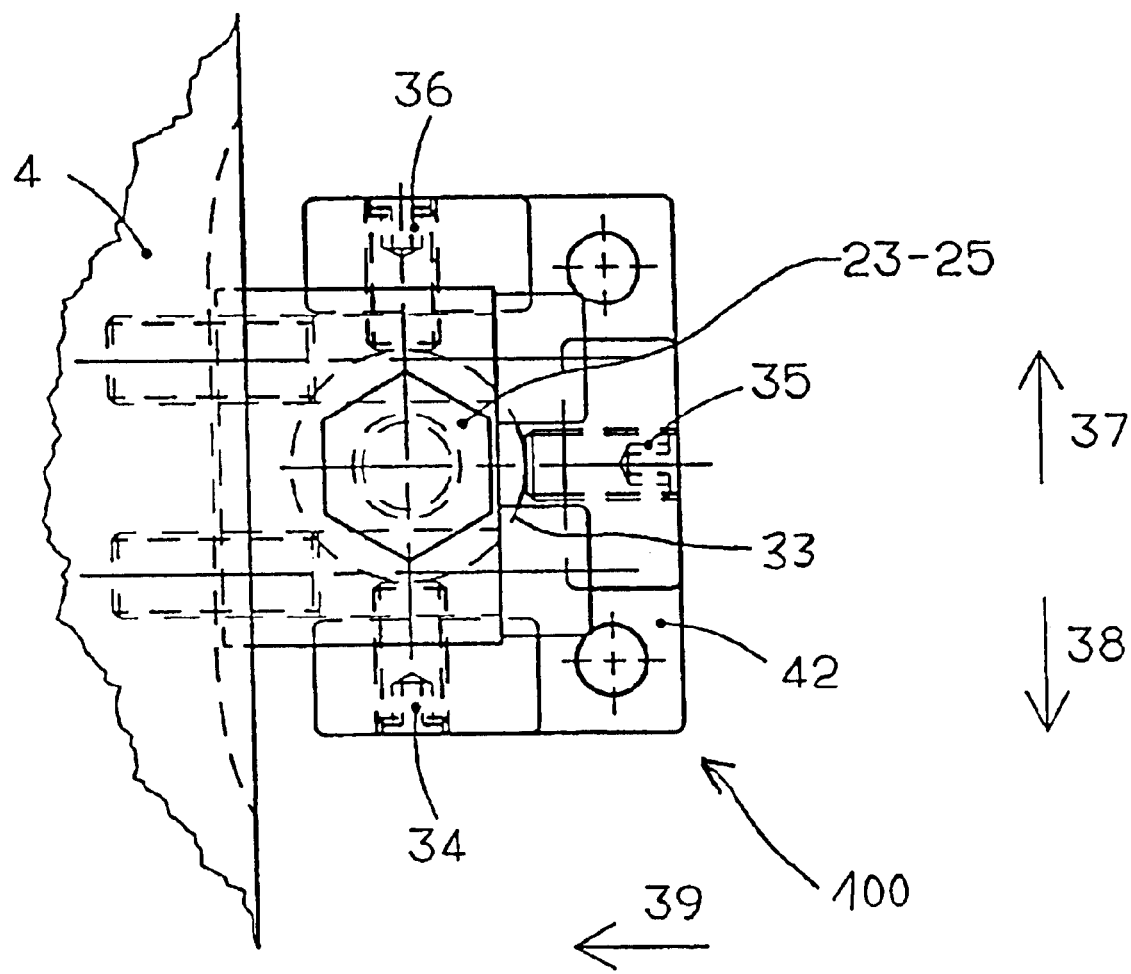
FIG. 5 is a plan view IV from FIG. 4.

FIG. 4 and FIG. 5 show the construction, which is known per se, of the adjustable feet 20 to 22. It is possible to move the adjusting screws 23 to 25 via threads in the block 29, which is screwed to the base frame 4. A clamping screw 30 prevents the adjusting screw 23 to 25 being displaced in an uncontrolled manner. The spherical end 31 of the lower end of the adjusting screw 23 to 25 is seated in a spherical recess 32 of a plate 33 which is, for example, circular, as a result of which an inclined position can be compensated for. By means of adjusting screws 34 to 36, the plate 33 can be pushed in directions 37 to 40 (cf. FIG. 3) and can also be pivoted about the perpendicular, which is shown by the double arrow 41. The plate 33 is supported via the base plate 42 which is screwed to the floor.

Figure 6:
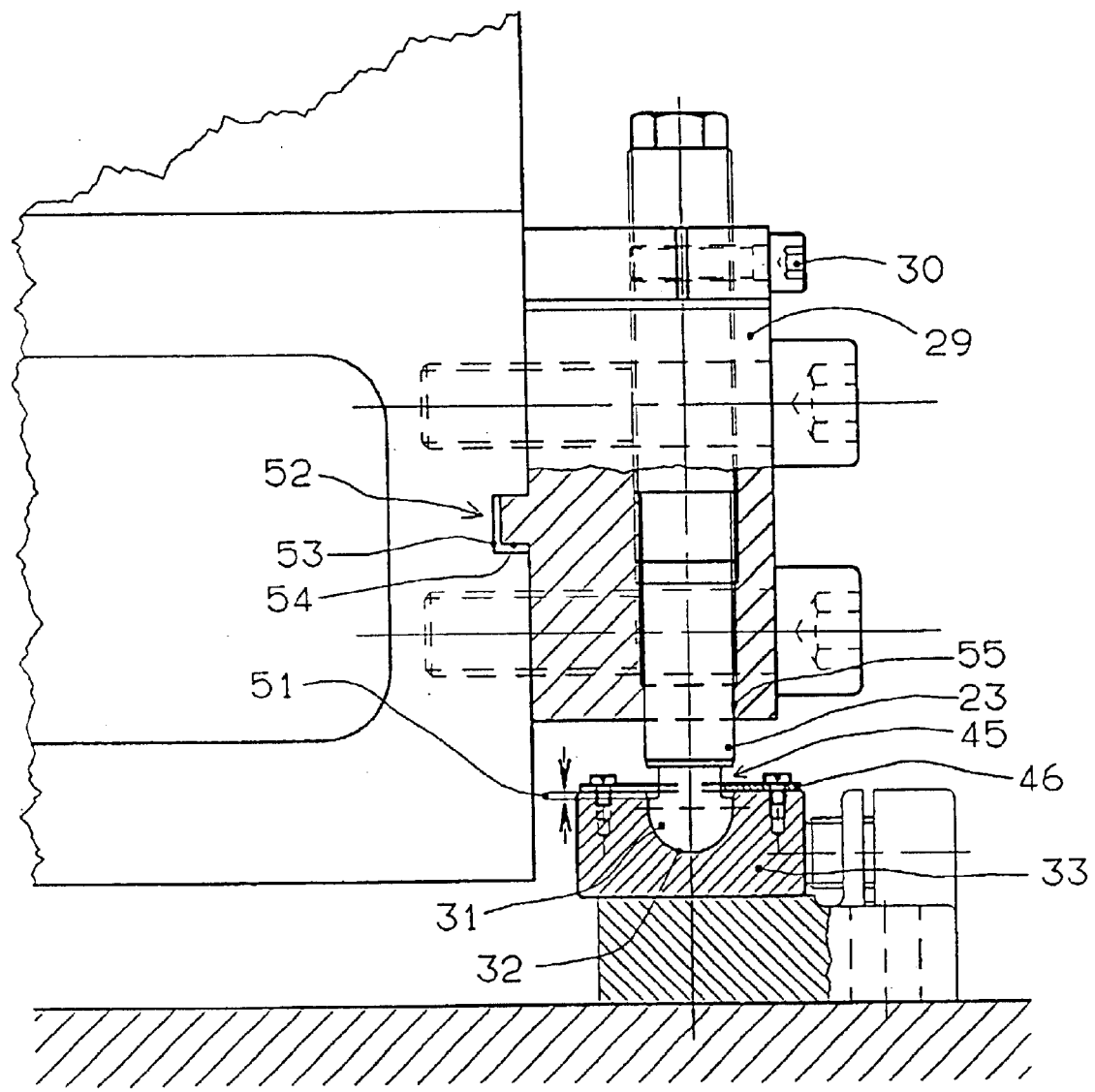
FIG. 6 is a partially cutaway elevation view of an adjusting screw according to FIG. 4.

FIG. 6 shows the adjusting screw 23 with its spherical end 31 supported in the recess 32 in the plate 33. The adjusting screw 23 is configured with an annular groove 45 at the transition between the screw body and the spherical end 31. A securing element 46 engages in this groove 45, is screwed to the plate 33 and prevents the adjusting screw 23 from being lifted out of the plate 33 while ensuring slight vertical play 51.

The adjusting screw 23 to 25 is guided by means of a low-play locating connection 55 in the block 29, which can be flange-mounted onto the printing unit 47 by means of a locking means 52 in the form of a groove 53 and tongue 54.

FIG. 3 shows a comparison of the previous four-point erection of printing units 47 and the three-point erection described here, i.e. the erection at three contact points 48 to 50. Adjustable feet 43; 44 would then be present instead of the adjustable foot 20. When the printing unit 47 is placed on an uneven floor and when the printing unit 47 is being erected, combined with adjusting processes at the feet 43; 44, the printing unit 47 temporarily stands only on three feet, which can lead to displacements and warping in the frame 1. As is known, the printing unit 47 is installed exactly at the site of installation, with, for example, exactly aligned impression cylinders 16 to 19. When moving a machine with four feet to another location on the floor or new clients, the result is necessarily a displacement in the frame 1, caused by the statically undetermined position of the four adjustable feet 21, 22, 43, 44. One of the four feet is subjected to a low load or is even free of loading. This state has to be cancelled out again by lengthy adjustment operations at the four feet, in order to re-establish the exact alignment, for example of the impression cylinders 16 to 19, which was achieved during installation of the printing unit 47. As is known, these difficulties are completely absent in the case of three-point erection. The exact installation state from the installation site remains preserved, warping and displacement as a result of an uneven floor is not possible.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An aligning apparatus for a printing unit, said aligning apparatus comprising:
    a base plate for fixing to an erection surface;
    at least one support plate which is rotatably mounted on said base plate, each said support plate having a spherical recess;
    at least one horizontal adjusting screw for adjusting the horizontal position of each said support plate with respect to said base plate; and
    at least one vertical adjusting screw for adjusting the vertical position of said printing unit with respect to said base plate, each said vertical adjusting screw having a spherical end which is rotatably mounted in a respective said spherical recess.

2. An aligning apparatus as in claim 1 further comprising a securing element for securing the end of each said vertical adjusting screw in a respective said spherical recess so that vertical play between the securing element and the spherical end is possible.

3. An aligning apparatus as in claim 1 further comprising three said support plates and three said vertical adjusting screws.

4. An aligning apparatus as in claim 3 wherein said aligning apparatus has only three said support plates and only three said vertical adjusting screws.

5. An aligning apparatus as in claim 1 further comprising, for each said vertical adjusting screw:
    a block which can be flange-mounted to said printing unit by means of a tongue and groove connection; and
    a low-play locating connection for guiding said adjusting screw in said block.

* * * * *